(12) United States Patent
Merendino, Sr.

(10) Patent No.: US 6,673,182 B1
(45) Date of Patent: Jan. 6, 2004

(54) GREEN TIRE HOLDING DEVICE WITH TURNING SPINDLE(S)

(75) Inventor: Paul A. Merendino, Sr., Mogadore, OH (US)

(73) Assignee: Bridgestone/Firestone North American Tire, LLC, Nashville, TN (US)

(*) Notice: Subject to any disclaimer, the term of this patent is extended or adjusted under 35 U.S.C. 154(b) by 252 days.

(21) Appl. No.: 09/651,785

(22) Filed: Aug. 30, 2000

(51) Int. Cl.[7] ............................. A47F 7/04; B29D 30/00
(52) U.S. Cl. ................... 156/110.1; 29/897.1; 156/396; 156/406.2; 211/23; 211/164
(58) Field of Search ................... 156/111, 396, 156/110.1, 406.2, 407, 421.6; 211/20, 23, 24, 164, 1.53–1.55; 425/38, 48, 26, 27; 29/897.1

(56) References Cited

U.S. PATENT DOCUMENTS

| | | | |
|---|---|---|---|
| 1,555,196 A | * | 9/1925 | Freeman .................. 156/407 |
| 1,646,967 A | | 10/1927 | Little |
| 1,850,238 A | * | 3/1932 | Maynard .................. 118/320 |
| 1,871,608 A | | 8/1932 | Hallinan |
| 2,271,855 A | * | 2/1942 | Cleveland et al. ............ 156/96 |
| 2,498,953 A | * | 2/1950 | Glynn ...................... 156/407 |
| 2,815,128 A | | 12/1957 | Kauffman et al. |
| 2,915,108 A | * | 12/1959 | Antraigue .................. 156/407 |
| 3,147,864 A | | 9/1964 | Sylvester et al. |
| 3,322,286 A | | 5/1967 | Sylvester et al. |
| 3,393,807 A | | 7/1968 | Sylvester et al. |
| 3,700,113 A | | 10/1972 | Hager et al. .................. 211/23 |
| 3,935,948 A | | 2/1976 | Podojil et al. ............... 211/23 |
| 4,007,080 A | | 2/1977 | Klopper et al. ............. 156/396 |
| 4,039,365 A | | 8/1977 | Takasuga et al. .......... 156/405 |
| 4,306,826 A | * | 12/1981 | Detwiler .................. 156/406.2 |
| 4,452,655 A | | 6/1984 | Pollard et al. .............. 156/126 |
| 5,626,241 A | | 5/1997 | Holden et al. .............. 211/23 |

FOREIGN PATENT DOCUMENTS

FR  1460639  10/1966

OTHER PUBLICATIONS

International Search Report (PCT/ISA/210).

* cited by examiner

Primary Examiner—Geoffrey L. Knable
(74) Attorney, Agent, or Firm—Cynthia S. Murphy; Michael R. Huber

(57) ABSTRACT

A green tire holding device (50) including a horizontal turning spindle (52) which supports and turns a green tire (T) so that no set portion of the tire is constantly subjected to the downward pull of the rest of the tire carcass. The spindle (52) can be programmed to automatically continuously turn the green tire (T) or to automatically turn the green tire (T) at spaced intervals corresponding to desired angular movements. In a tire manufacturing method, the holding device (50) is used to turn the green tire (T) during a pre-curing wait cycle to thereby minimize distortion of the green tire (T).

1 Claim, 2 Drawing Sheets

GREEN TIRE HOLDING DEVICE WITH TURNING SPINDLE(S)

FIELD OF THE INVENTION

This invention relates generally as indicated to a device for holding green tires during a pre-curing wait cycle.

BACKGROUND OF THE INVENTION

In the manufacture of a tire, its various components, including reinforcing components embedded in a matrix of unvulcanized rubber or other unvulcanized rubberlike material, are assembled on a building form. The tire at this stage of the manufacturing process is commonly called a green tire. After being built, a green tire is transported to a shaping and vulcanizing press whereat it is shaped to its final form and vulcanized. There is almost always a waiting period between the production of the green tire and its subsequent curing. This time period can be referred to as the pre-curing wait cycle and can extend anywhere from a few hours to several days.

During the pre-curing wait cycle, a green tire is usually stored on a holding device. Of particular relevance to the present invention is a green tire holding device having a horizontal arm which extends through the opening of the green tire and engages an upper section of the inner periphery of the green tire. In other words, the green tire hangs from the horizontal arm. In this vertical position, the green tire has a tendency to sag or droop under its own weight, due to gravitational forces on the unsupported portions of the green tire, and become distorted. Specifically, the upper portion of the green tire which rests on the horizontal arm is constantly subjected to the gravitational pull of the lower portions of the green tire.

SUMMARY OF THE INVENTION

A need exists for a device that counters the constant gravitational forces for a green tire during the pre-curing wait cycle for that tire.

The present invention provides a green tire holding device comprising a frame and a turning spindle extending substantially horizontally from the frame. Preferably, the turning spindle turns at least one complete revolution. The turning spindle is shaped and sized to support a green tire and to turn the green tire so that no specific portion is subjected to the unsupported effect of gravitational force whereby distortion of the green tire during a pre-curing wait cycle is minimized. The device can include a plurality of turning spindles positioned to support the same green tire and/or different green tires. If a single spindle (per green tire) design is used, a convenient modification of current equipment is possible by attaching the turning spindle to the horizontal arm of an existing green tire holding device.

The turning spindle can continuously rotate the tire at a substantially constant speed of one revolution per hour or less. Alternatively, the turning spindle can rotate the green tire 180° or less at spaced intervals. In either case, the turning spindle can be programmed for automatic turning operation thereby eliminating the need for any special training or procedures at the factory.

Thus, a method of manufacturing a tire according to the present invention comprises the steps of making a green tire, placing the green tire on a green tire holding device for a duration of a pre-curing wait cycle, and then curing the green tire. The green tire holding device has at least one turning spindle and the green tire is turned during the pre-curing wait cycle so that no specific portion of the green tire is subjected to the unsupported effect of gravitational force.

The present invention provides these and other features hereinafter fully described and particularly pointed out in the claims. The following description and drawings set forth in detail certain illustrative embodiments of the invention. These embodiments are indicative, however, of but a few of the various ways in which the principles of the invention can be employed.

DRAWINGS

DETAILED DESCRIPTION

Figure 1:
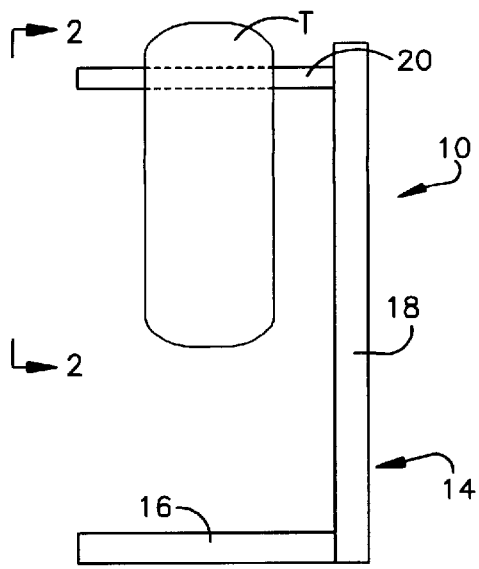
FIG. 1 is a side view of a conventional green tire holding device, the device including a horizontal arm on which a green tire is supported.
Figure 2:
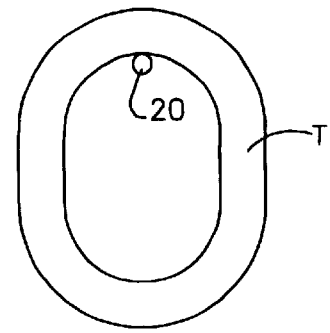
FIG. 2 is a front schematic view of the horizontal arm and the green tire of the holding device of FIG. 1.

Referring now to the drawings, and initially to FIGS. 1 and 2, a conventional green tire holding device 10 for supporting a green tire T is shown. The holding device 10 comprises a frame 14 including a floor support 16, a vertical post 18, and a horizontal arm 20. The arm 20 extends through the central opening of the green tire T and hangs therefrom. As is shown schematically in FIG. 2, the green tire T has a tendency to sag or droop under its own weight and become distorted. Specifically, the upper portion of the green tire T which rests on the horizontal arm 20 is constantly subjected to the gravitational forces exerted on the lower portion of the green tire T. In other words, the upper portion of the green tire T is supported against the effects of gravity, whereas the lower portion of the green tire T is not. The composition of the green tire T inherently contributes to the extent of distortion caused by gravitational forces during the pre-curing wait cycle on the lower portion of the green tire T.

Figure 3:
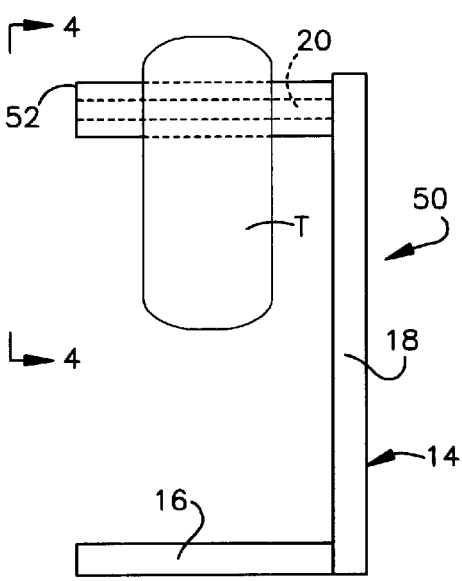
FIG. 3 is a side view of a green tire holding device according to the present invention, the device including a turning spindle on which the green tire is supported.
Figure 4:
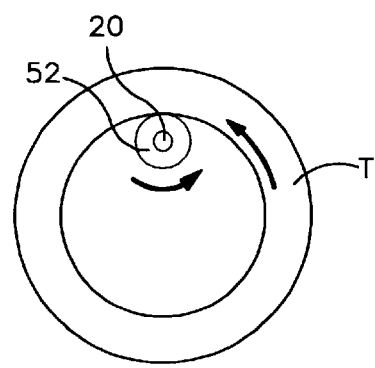
FIG. 4 is a front schematic view of the horizontal arm, the turning spindle and the green tire of the holding device of the present invention.

Referring now to FIGS. 3 and 4, a green tire holding device 50, according to the present invention, is shown. The holding device 50 includes a horizontal spindle 52 on which the green tire T is supported. The spindle 52 engages an upper section of the inner periphery of the tire T. A motor (not specifically shown in the drawings) turns, and preferably rotates, the spindle 52 so that, as is shown schematically in FIG. 4, the green tire T is turned while it is supported on the horizontal arm 20. In this manner, no set portion of the tire T is constantly subjected to the downward pull of the rest of the tire carcass whereby distortion of the green tire during the pre-curing wait cycle is minimized. It may be noted that the tire T may still take on an oblong shape while hanging from spindle 52, however, but this shape will not result in any significant distortion of the tire carcass.

The spindle 52 can turn continuously at a substantially constant speed, such as a spindle speed corresponding to less than one revolution per hour of the green tire T. One skilled in the art can adjust the spindle speed and extent of turning to accommodate variations in green tire compositions and duration of pre-curing wait cycles, without departing from the scope of the present invention.

Alternatively, the spindle 52 can turn at a relatively faster speed in spaced intervals corresponding to desired angular movement of the green tire T. The desired angular movement of the green tire T should be less than 180° and should be sufficient to insure that no particular portion(s) of the tire dominate the uppermost position during the pre-curing wait cycle. For example, green tire rotational movement can be less than 90°, less than 60°, less than 45°, less than 30° and/or less than 15°, with preference for the smaller degrees since it provides a more even distribution. The spindle 52 can always turn in the same direction (counterclockwise in the illustrated example) or it can turn in different directions if a reversible motor is used. In any event, the spindle 52 can be programed using electronic circuitry (not shown) known to those skilled in the art for automatic operation during the pre-curing wait cycle thereby eliminating the need for any special training or procedures at the factory.

In the illustrated green tire holding device 50, the conventional holding device 10 is modified to provide the improvements of the invention. To this end, the spindle 52 includes a central cylindrical bore sized and shaped to receive the horizontal arm 20. The entire spindle 52 can turn relative to the horizontal arm 20 or, instead, the spindle 52 can include an inner stationary portion which is secured to the arm 20 and an outer portion which turns around the inner portion. In this manner, existing equipment can be modified at a reasonable cost to practice the present invention. That being said, tire holding devices which are originally built to include the turning spindle 52 are possible with, and contemplated by, the present invention.

Figure 5:
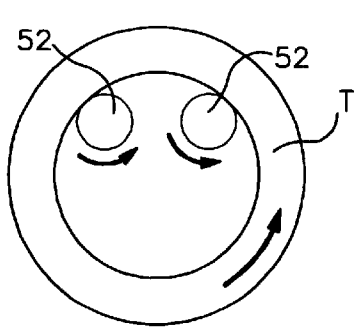
FIGS. 5 and 6 are front schematic views showing alternate spindle arrangements.
Figure 6:
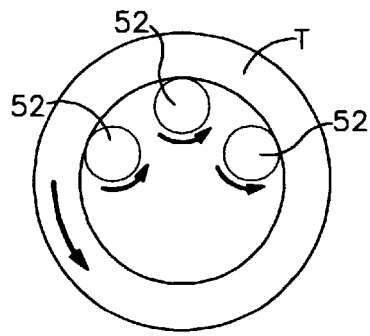

The green tire holding device of the present invention can include more than one turning spindle 52, such as the two spindles 52 shown in FIG. 5 and the three spindles show in FIG. 6. In the two-spindle embodiment of the invention, the spindles 52 can be placed approximately at the two-o-clock position and the ten-o-clock position relative to the green tire T. (See FIG. 5.) In the three-spindle embodiment of the invention, the spindles 52 can be placed at approximately the twelve-o-clock position, the two-o-clock position, and the ten-o-clock position. (See FIG. 6.) In either case, the plurality of spindles 52 are synchronized to turn at a constant speed and/or set intervals as discussed above in connection with the single-spindle embodiment of the invention.

Figure 7:
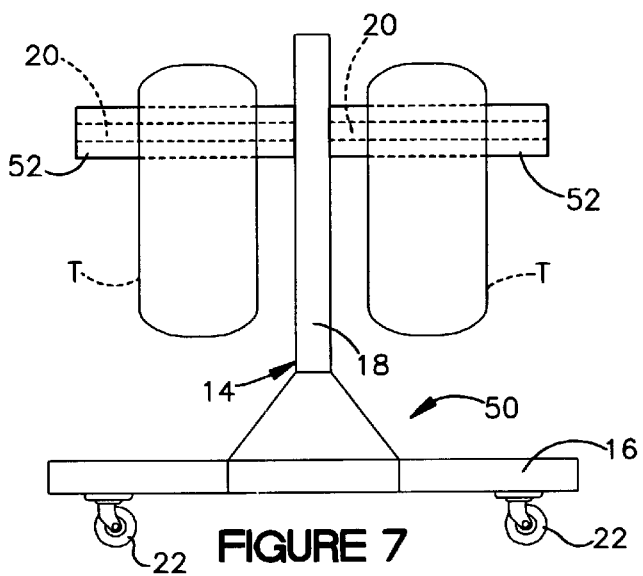
FIG. 7 is a side view of another green tire holding device according to the present invention, this holding device including a pair of turning spindles positioned on opposite sides of a vertical post.

Additionally or alternatively, a plurality of turning spindles 52 can be provided on the frame 14 of the green tire holding device 50 to hold different green tires T. By way of an example, the green tire holding device 50 shown in FIG. 7 includes a pair of turning spindles 52 positioned on opposite sides of its frame's vertical post 18. The illustrated holding device 50 is modified from a conventional green tire holding device including a floor support 16, the vertical post 18, and horizontal arms 20 extending in opposite directions from the post 18. Wheels or castors 22 are provided on the floor support 16 for transfer of the green tires T, while on the holding device 50, to the curing location.

Figure 8:
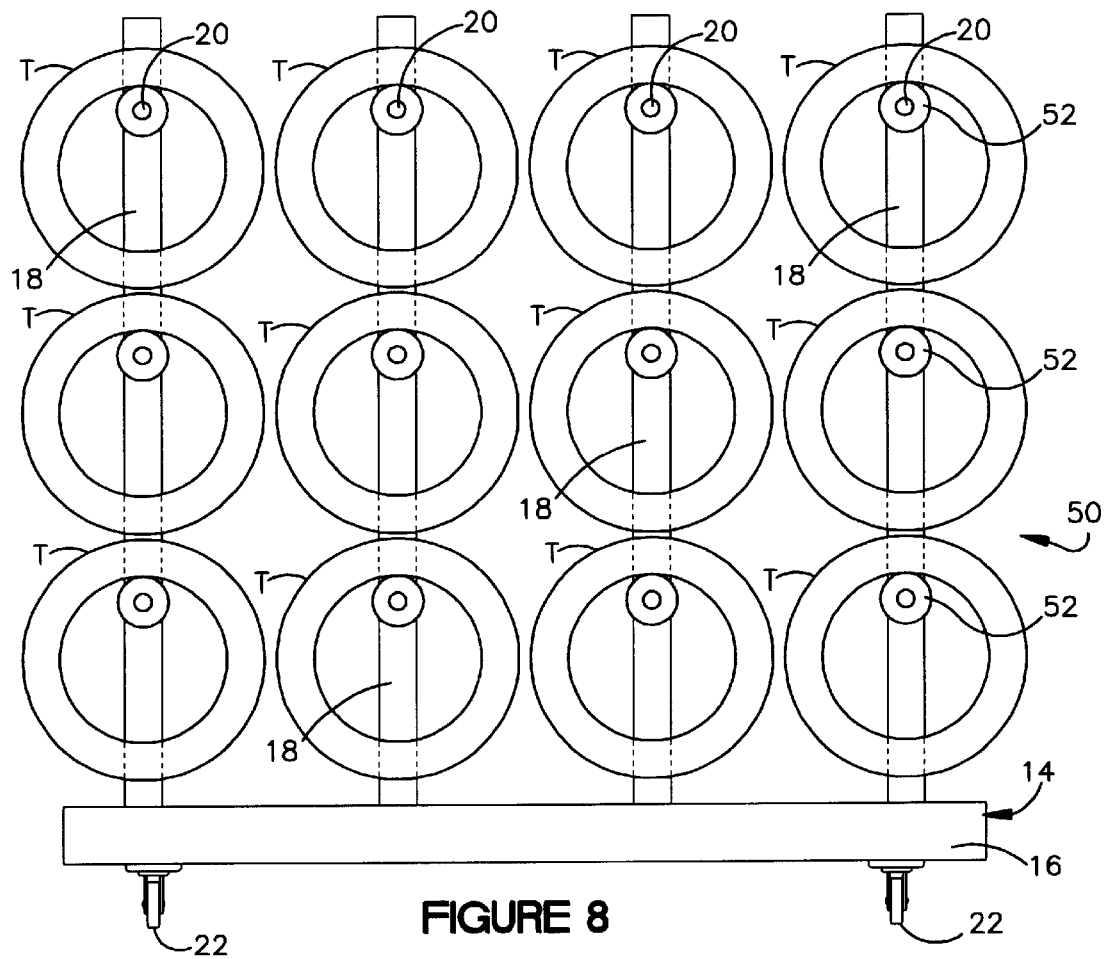
FIG. 8 is a front view of another green tire holding device according to the present invention, this holding device including a vertical row of a plurality of turning spindles positioned on each of a plurality of vertical posts.

By way of another example, the green tire holding device 50 shown in FIG. 8 includes a vertical row of a plurality of turning spindles 52 extending outwardly from each of a plurality of vertical posts 18. The illustrated holding device 50 is a modified version of a conventional green tire holding device including a floor support 16, the vertical posts 18, and a row of horizontal arms 20 extending outward from each of the vertical posts 18. Wheels or castors 22 can be provided on the floor support for transfer of the tires.

In the illustrated embodiments, the spindle 52 positioned within the central opening of the green tire T is positively driven to provide the desired turning motion. However, other turning designs are possible with, and contemplated by, the present invention. For example, a rotating shaft adjacent the outer periphery of the tire T could be positively driven and the spindle 52 could simply have a bearing surface for allowing turning of the tire T therearound.

In the manufacture of a tire, its various components, including reinforcing components embedded in a matrix of unvulcanized rubber or other unvulcanized rubberlike material, can be assembled on a building form to make the green tire T. The green tire T can then be stored on the holding device 50 of the present invention during its pre-curing wait cycle and for transport to the shaping and vulcanizing press for molding and curing into its final form.

One can now appreciate that the present invention solves green tire distortion problems by turning the tire carcass during the pre-curing wait cycle thereby assuring that each portion receives a shaped amount of time subject to gravitational forces without spindle support and no specific portion is constantly subjected to that downward pull from the rest of the tire carcass. Although the invention has been shown and described with respect to a certain embodiment, it is obvious that equivalent alterations and modifications will occur to others skilled in the art upon the reading and understanding of this specification. The present invention includes all such alterations and modifications and moreover is limited only by the scope of the following claims.

What is claimed is:

1. A method of making a green tire holding device comprising a frame which includes a horizontal arm, and a turning spindle attached to the horizontal arm and extending substantially horizontally from the frame; the turning spindle being shaped and sized to support a green tire and to turn the green tire so that no specific portion of the green tire is subjected to the unsupported effect of gravitational force, whereby distortion of the green tire during a pre-curing wait cycle is minimized; said method comprising the steps of:

provding an existing green tire holding device comprising the frame and the horizontal arm for supporting a green tire, said existing device previously used to support a green tire; and retrofitting the existing green tire holding device, said retrofitting step comprises attaching the turning spindle to the horizontal arm.

* * * * *